(12) United States Patent
Arul

(10) Patent No.: US 11,400,980 B2
(45) Date of Patent: Aug. 2, 2022

(54) RIB-LESS HOIST STRUCTURE FOR TRUCK BODY

(71) Applicant: Caterpillar Inc., Peoria, IL (US)

(72) Inventor: Samuel J. Arul, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 244 days.

(21) Appl. No.: 16/892,997

(22) Filed: Jun. 4, 2020

(65) Prior Publication Data
US 2021/0380169 A1    Dec. 9, 2021

(51) Int. Cl.
*B62D 21/09*  (2006.01)
*B62D 33/02*  (2006.01)
*B60P 1/28*   (2006.01)

(52) U.S. Cl.
CPC ............. *B62D 21/09* (2013.01); *B60P 1/286* (2013.01); *B62D 33/0222* (2013.01); *B60Y 2200/41* (2013.01)

(58) Field of Classification Search
CPC ...................................................... B60P 1/286
USPC ......... 298/1 R, 117, 22 R, 7; 296/183.2, 184
See application file for complete search history.

(56) References Cited

U.S. PATENT DOCUMENTS

| | | | | |
|---|---|---|---|---|
| 6,592,172 | B2* | 7/2003 | Fujan | B62D 33/02 298/17 R |
| 8,820,844 | B2* | 9/2014 | Moon | B60P 1/286 298/22 R |
| 9,630,544 | B2 | 4/2017 | Kita et al. | |
| 9,751,445 | B1 | 9/2017 | Arul et al. | |
| 2014/0124337 | A1* | 5/2014 | Murphy | B02C 23/02 198/836.1 |
| 2015/0165957 | A1* | 6/2015 | Sarangapani | B60P 1/286 296/183.2 |
| 2017/0066359 | A1 | 3/2017 | Rissman | |
| 2018/0312097 | A1 | 11/2018 | Petrie | |
| 2019/0381924 | A1 | 12/2019 | Hettinger | |

FOREIGN PATENT DOCUMENTS

| | | |
|---|---|---|
| CN | 201721522 U | 1/2011 |
| CN | 202213521 U | 5/2012 |
| CN | 204936908 U | 1/2016 |
| CN | 103661066 B | 5/2016 |
| JP | S60163128 | 10/1985 |
| WO | 2019110020 | 6/2019 |

\* cited by examiner

*Primary Examiner* — D Glenn Dayoan
*Assistant Examiner* — Sunsurraye Westbrook
(74) *Attorney, Agent, or Firm* — Oblon, McClelland, Maier & Neustadt

(57) ABSTRACT

A hoist structure for a body of a truck can be comprised of a hoist plate arrangement extending in a first direction and configured to be rotatably coupled to a hoist member of the truck; and a plurality of external gussets spaced from each other in the first direction and extending in a second direction perpendicular to the first direction. Each of the external gussets can interface with the hoist plate arrangement, and a portion of each of the external gussets can extend in the second direction from a first side of the hoist structure arrangement.

20 Claims, 7 Drawing Sheets

RIB-LESS HOIST STRUCTURE FOR TRUCK BODY

TECHNICAL FIELD

The present disclosure relates to support structures for haul trucks, and more particularly to hoist support structures for bodies of haul trucks, and systems, arrangements, assemblies, and methods thereof.

BACKGROUND

Conventionally, a hoist structure of body of a haul truck, such as a mining truck, may experience relatively high loads and stresses, for instance, when the body is hoisted to dump material. Such loads and stresses can be particularly high on an uneven ground surface. To more evenly distribute loads across the body, transverse ribs may be provided along the bottom of the body, attached to the hoist structure and possibly to longitudinal rails also provided along the bottom of the body. However, the addition of transverse ribs can make the body heavier and require extensive welding and/or manufacturing efforts.

U.S. Pat. No. 9,630,544 ("the '544 patent") shows interfaces between a dump body and a pair of hoist cylinders attached as hydraulic cylinders that connect the frame to the dump body. However, the '544 patent does not show the interfaces interfacing with the pair of longitudinal rails.

SUMMARY OF THE DISCLOSURE

In one aspect, a hoist structure is disclosed. The hoist structure can comprise an elongate hoist plate arrangement extending in a first direction and configured to be rotatably coupled to a hoist member of a haul truck; a plurality of external gussets spaced from each other in the first direction and extending in a second direction perpendicular to the first direction. Each of the external gussets can interface with the elongate hoist plate arrangement and/or a portion of each of the external gussets extends in the second direction from a first side of the elongate hoist plate arrangement.

In another aspect, a support system for a body of a haul truck is disclosed. The support system can comprise a first hoist structure; and a second hoist structure spaced from the first hoist structure in a transverse direction of the body of the haul truck such that a first longitudinal support structure of the body and a second longitudinal support structure of the body are between the first hoist structure and the second hoist structure. Each of the first hoist structure and the second hoist structure can include a hoist plate arrangement extending in a longitudinal direction of the body and configured to be rotatably coupled to a hoist member of the haul truck, and a plurality of external gussets spaced from each other in the longitudinal direction and extending in the transverse direction, the external gussets interfacing with the hoist plate arrangement, and a portion of each of the external gussets extending from the hoist plate to a closest one of the first longitudinal support structure and the second longitudinal support structure.

And in yet another aspect, an off-highway rear haul truck is disclosed. The off-highway rear haul truck can comprise a dump body configured to be operatively coupled to a frame of the haul truck, the dump body including a bottom wall with an upper surface and a lower surface opposite the upper surface; a first longitudinal rail and a second longitudinal rail provided on the lower surface of the bottom wall, the first and second longitudinal rails being spaced from each other in a transverse direction of the dump body, and each of the first and second longitudinal rails extending in a longitudinal direction along the lower surface of the dump body; and a first rib-less hoist structure and a second rib-less hoist structure provided laterally outside of the first longitudinal rail and the second longitudinal rail, respectively, each of the first and second rib-less hoist structures being free of any transverse support structures that extend at least from the first longitudinal rail to the second longitudinal rail. Each of the first rib-less hoist structure and the second rib-less hoist structure can include a pair of hoist plates spaced from each other in the transverse direction and extending in the longitudinal direction, the pair of hoist plates being configured to be rotatably coupled to a hoist member, and a plurality of external gussets spaced from each other in the longitudinal direction and extending in the transverse direction, the external gussets interfacing with the pair of hoist plates, and a portion of each of the external gussets being provided between the hoist plates and a closest one of the first longitudinal rail and the second longitudinal rail.

Other features and aspects of this disclosure will be apparent from the following description and the accompanying drawings.

DETAILED DESCRIPTION

Embodiments of the disclosed subject matter involve hoist support structures for bodies of haul trucks, and systems, arrangements, assemblies, and methods thereof.

Figure 1:
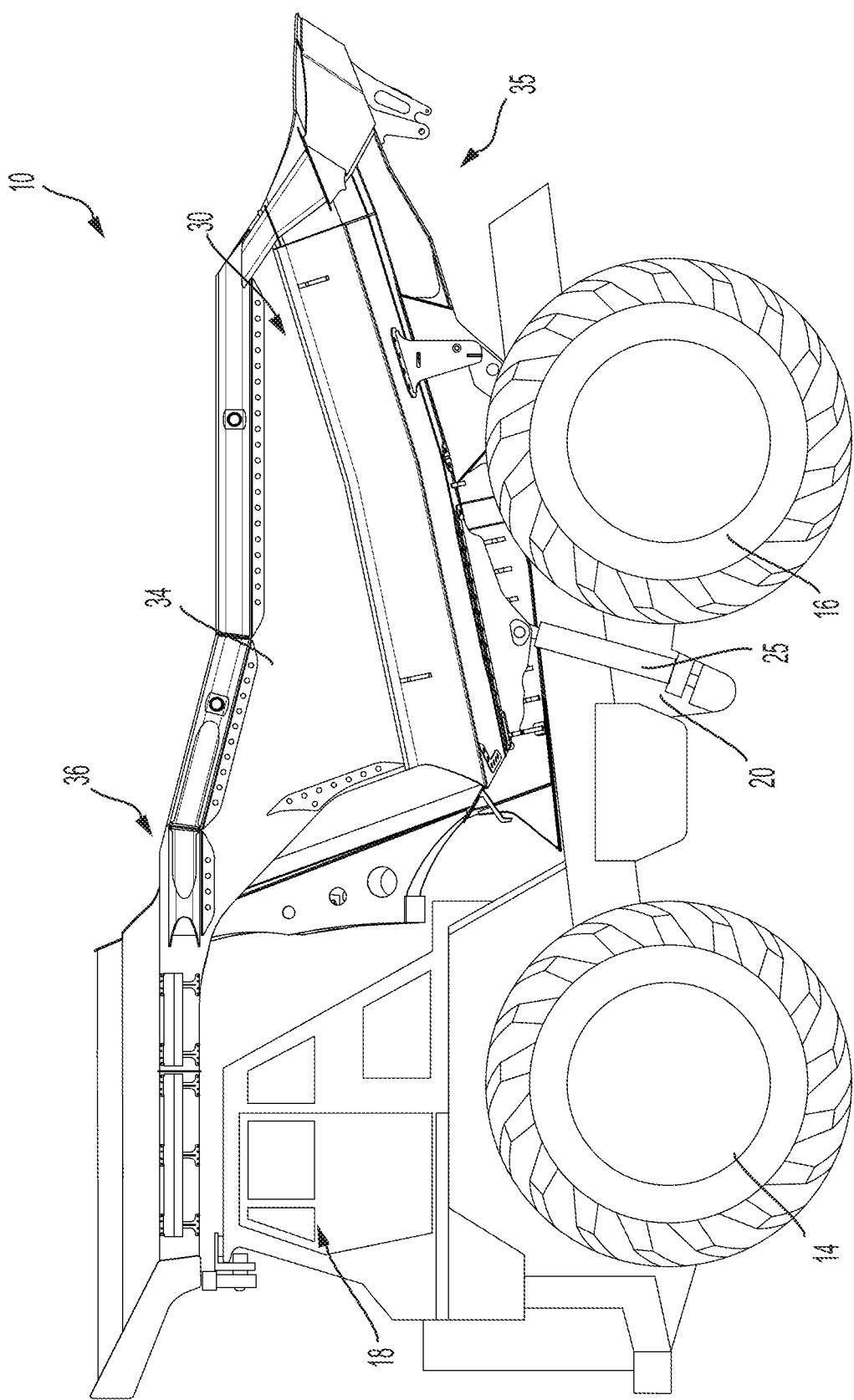
FIG. 1 is a side view of a truck according to embodiments of the disclosed subject matter.

Referring now to the drawings and with specific reference to FIG. 1, this figure illustrates an exemplary embodiment of a truck 10, according to one or more embodiments of the disclosure. Truck 10 may perform some type of operation associated with an industry such as mining, construction, or any other industry known in the art. For example, as shown in FIG. 1, truck 10 may be an earth moving machine, particularly, an off-highway rear haul truck 10.

Truck 10 may have a frame 20 supported by front wheels 14 and rear wheels 16 (including respective tires). The front and rear wheels 14, 16 may be connected to frame 20 by front suspension members and rear suspension systems, respectively (not expressly shown). Truck 10 may also include a bed or body 30 supported by the frame 20. Such bed or body 30 may be referred to herein as a dump body 30. The body 30 can be configured as a receptacle to receive hauling material.

A rear portion 35 of the body 30 can be pivotably coupled or attached to a portion (including portions) at a rear of the frame 20. Thus, the body 30 can be pivoted from a lowermost or rest position (i.e., not raised), such as shown in FIG.

1, to a raised position (e.g., fully raised). That is, the body 30 can be pivoted at the rear portion 35 of the frame 20 to raise or lower the portion of the body 30 in front of the pivot (and hence move the portion of the body 30 behind the pivot in the opposite direction). Such pivoting of the body 30 to raise a front portion 36 of the body 30 can be to dump content from within the body 30. Likewise, pivoting of the body 30 to lower the front portion 36 of the body 30 to the rest position can be to receive content in the body 30. The pivoting can be performed using a pair of hoist members 25 (which may include cylinders) operatively coupled to the frame 20 and the body 30.

Truck 10 may have an operator cabin 18 supported by the frame 20. Truck 10 may also be equipped with a steering mechanism and controls to move the truck 10 and controls to raise and lower body 30. The steering mechanism and the controls may be located within the operator cabin 18 of the truck 10.

Truck 10 may have a prime mover (not expressly shown) supported by the frame 20. The prime mover may be configured to propel the front and rear wheels 14, 16 in the forward or rearward direction. The prime mover may be lengthwise aligned on the frame 20 along a travel direction of the truck 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Figure 2:
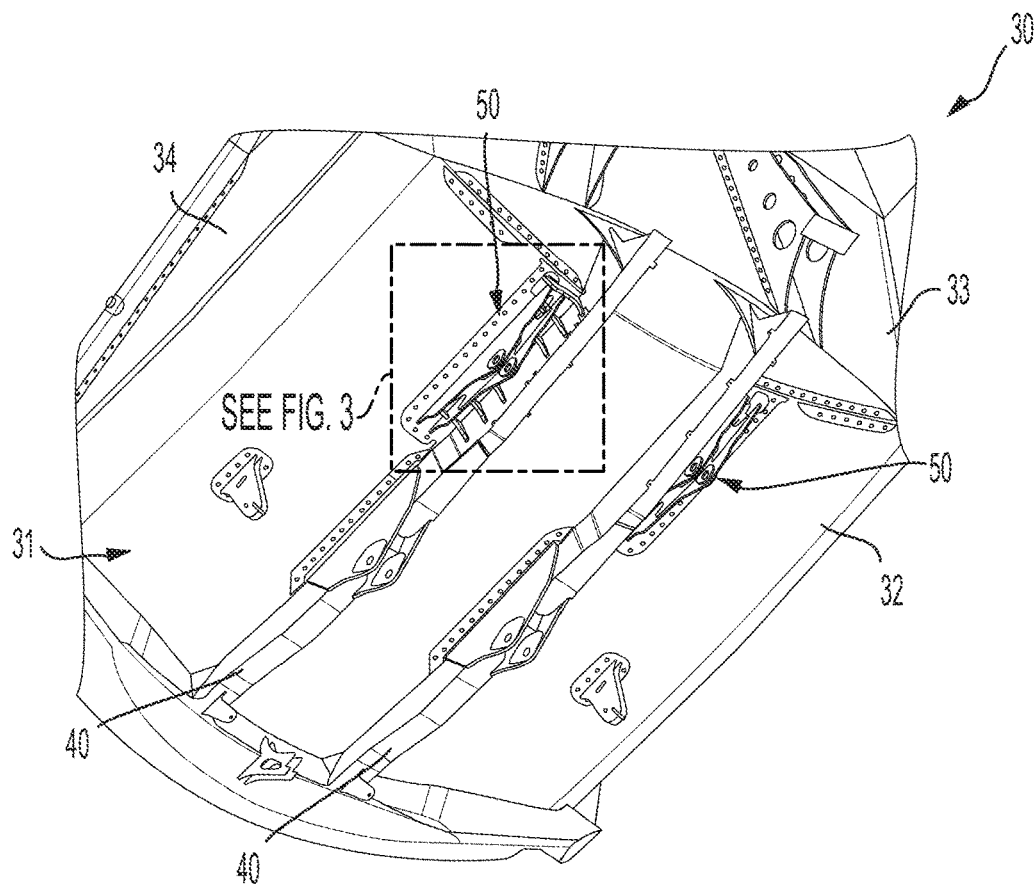
FIG. 2 is a bottom view of a body of a truck according to embodiments of the disclosed subject matter.
Figure 3:
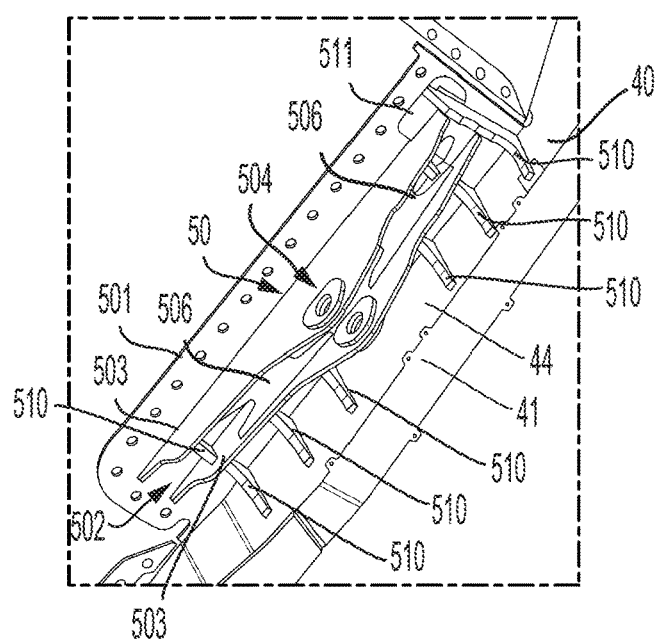
FIG. 3 is an enlarged portion of the bottom of the body of FIG. 2.

Turning to the other figures, FIG. 2 shows a bottom view of the body 30. The body 30 can have a bottom wall 31, which may be referred to as a floor, a front wall 33, and a pair of side walls 34. The bottom wall 31 can have a lower surface 32 and an upper surface (not expressly shown) opposite the lower surface 32.

A plurality of longitudinal support structures 40, which may be referred to herein as first or second longitudinal support structures 40, can be provided along the lower surface 32 of the bottom wall 31. According to one or more embodiments, the bottom wall 31 may have only two longitudinal support structures 40. The longitudinal support structures 40 may be in the form of rails, as a non-limiting example.

The longitudinal support structures 40, which can be coupled (e.g., welded) to the lower surface 32 of the bottom wall 31, can extend or run in a longitudinal direction along the lower surface 32. For instance, as shown in FIG. 2, the longitudinal support structures 40 can extend along the entire length of the lower surface 32. In this regard, the longitudinal support structures 40 can extend as a single continuous unit, or may be multiple units coupled (e.g., welded) together. Embodiments of the disclosed subject matter, however, are not limited to only longitudinal support structures 40 that extend the entire length of the lower surface 32. That is, in some embodiments, the longitudinal support structures 40 may not extend the entire length of the lower surface 32 of the bottom wall 31.

Optionally, the longitudinal support structures 40 can run parallel to each other. The longitudinal support structures 40 can also be spaced from each other in a transverse direction of the body 30. The longitudinal support structures 40 can be fixedly coupled (e.g., welded) to the bottom wall 31. In terms of geometry, the longitudinal support structures 40 can be rectangular or generally rectangular, such as shown in the figures, or alternatively can be some other geometrical shape, such as trapezoidal, I-beam, or T-beam.

A plurality of hoist structures 50 may also be provided on the bottom wall 31. The hoist structures 50 may be provided laterally outside of the longitudinal support structures 40, such as shown in FIG. 2. The hoist structures 50 may also be positioned closer to the front wall 33 than a rear of the body 30 and/or forward of a transverse midline of the bottom wall 31. The hoist structures 50 may be fixedly coupled (e.g., welded) to the bottom wall 31 directly or indirectly. As shown, the longitudinal support structures 40 can have a length greater than a length of the hoist structure 50.

The hoist structures 50 may be free of any transverse support structures (e.g., rail or rib structures) that extend at least from one longitudinal support structure 40 to the other longitudinal support structure 40 and/or that extend at least from one longitudinal support structure 40 to the side edge of the bottom wall 31. Hence, the hoist structures 50 may be referred to as rib-less hoist structures 50. Optionally, a portion of the bottom wall 31 adjacent to the hoist structure 50 and below the hoist structure 50 may be free of or without any transverse support structures (e.g., rail or rib structures) that extend at least from one longitudinal support structure 40 to the other longitudinal support structure 40.

Turning to FIG. 3, FIG. 4, FIG. 8, and FIG. 9, each hoist structure 50 can include a hoist plate arrangement 502 and a plurality of external gussets 510. Discussed in more detail below, the external gussets 510 can interface with the hoist plate arrangement 502. The hoist plate arrangements 502 may extend parallel to each other and/or parallel to the respective adjacent longitudinal support structure 40.

The hoist plate arrangement 502 can be spaced from the longitudinal support structure 40 in the transverse direction and extend in the longitudinal direction. Hence, the hoist plate arrangement 502 may be characterized as elongate. The hoist plate arrangement 502, which can include a pair of hoist plates 503 spaced from each other in the transverse direction, can be configured to be rotatably coupled to the hoist member 25 via a connection interface 504.

Figure 8:
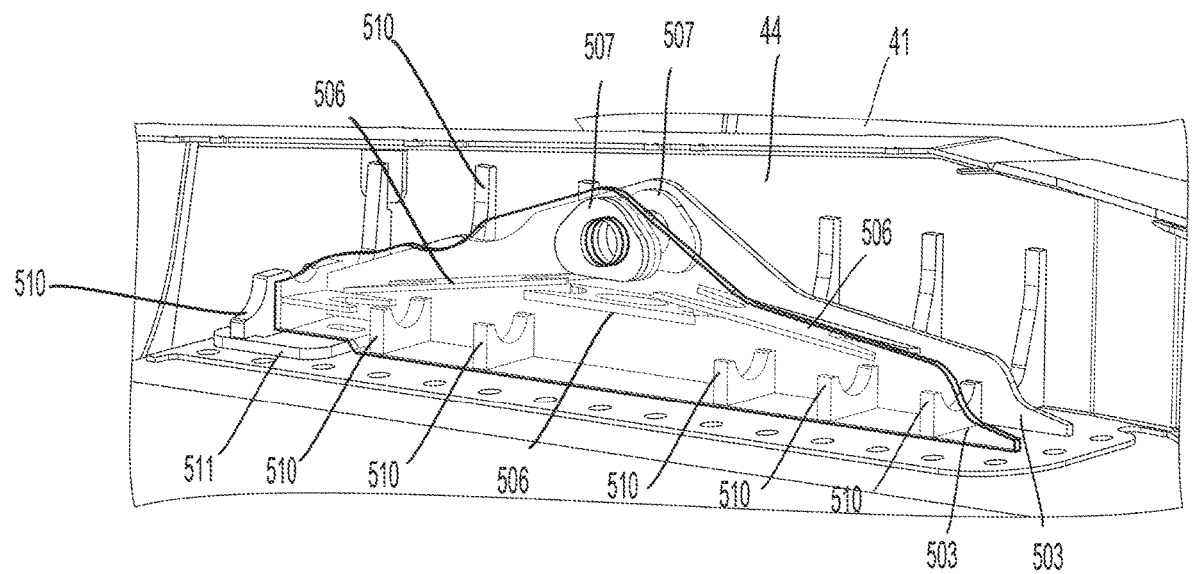
Figure 9:
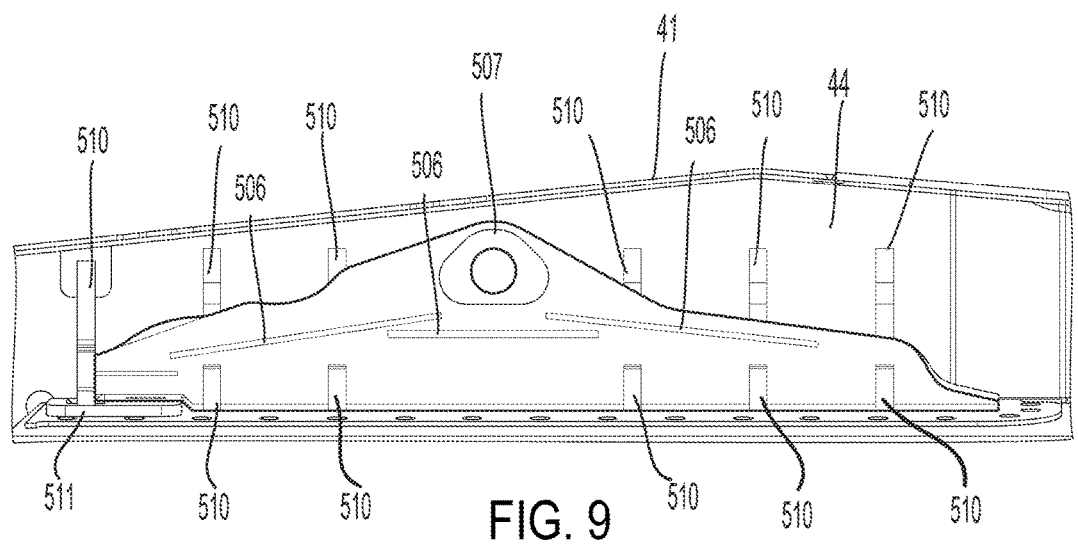
FIG. 9 is a partially transparent side view of the hoist structure of FIG. 4.

One or more gussets 506 may be provided between the hoist plates 503, extending from one hoist plate 503 to the other hoist plate 503. As shown in FIG. 8 and FIG. 9, the gussets 506 can contact only the hoist plates 503, and may not contact (e.g., be connected) to doublers 507 around bores of the connection interface 504. The middle one of the gussets 506 may be parallel to the lower surface 32 of the bottom wall 31, and the two gussets 506 on opposite sides of the middle gusset 506 can be angled at a positive angle toward the middle gusset 506, such as shown in FIG. 9. Optionally, end portions of the gussets 506 may overlap. That is, opposite ends of the middle gusset 506 may be overlapped by closest ends of the other two gussets 506, such as shown in FIG. 9. Optionally, the gussets 506 may be H-shaped. Generally, the gussets 506 can reduce stress or loads created at or around the bore of the connection interface 504 during actuation of the hoist member 25. The gussets 506 can also reduce overall stress on an outer perimeter of the hoist plate 503, which may protect and/or improve the weld joint life of the hoist plate 503. And the gussets 506 can assist with transfer and distribution of loads between the hoist plates 503.

The external gussets 510, which can extend in the transverse direction, can be spaced from each other in the longitudinal direction. According to one or more embodiments, the external gussets 510 can be in the form of a plate, extending in the transverse direction. The external gussets 510 may also include a plurality of cut-outs, for instance, U-shaped cutouts. The external gussets 510 can be in the form of a single unit or one-piece, or alternatively two-pieces, for instance, a first piece between the hoist plates 503 and a second piece between the hoist plate arrangement 502 and the longitudinal support structure 40.

Figure 4:
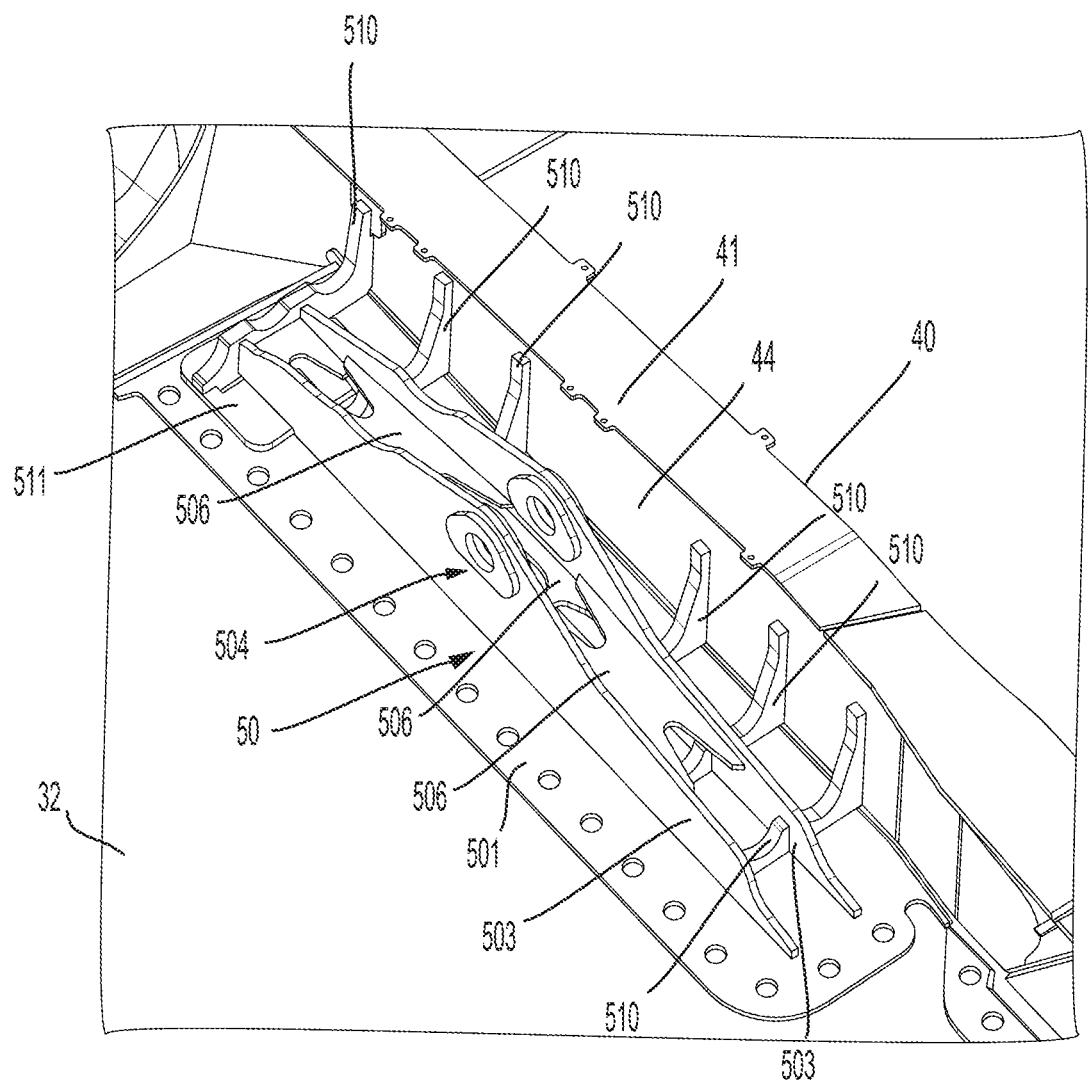
FIG. 4 shows a hoist structure according to embodiments of the disclosed subject matter.
Figure 5:
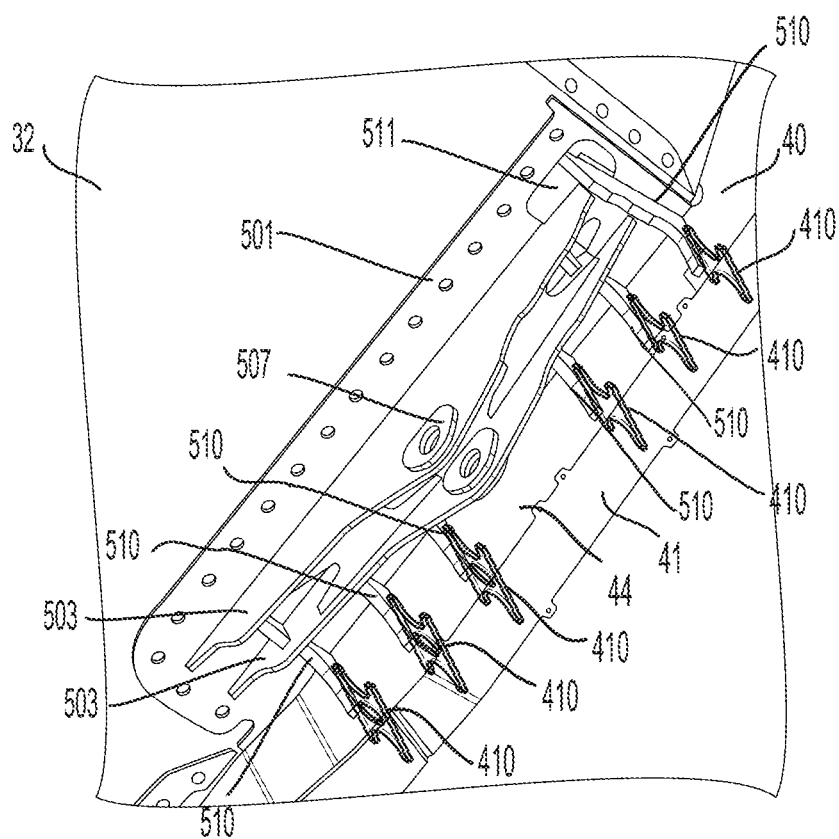
FIGS. 5-8 show partially transparent perspective views of the hoist structure of FIG. 4.
Figure 7:
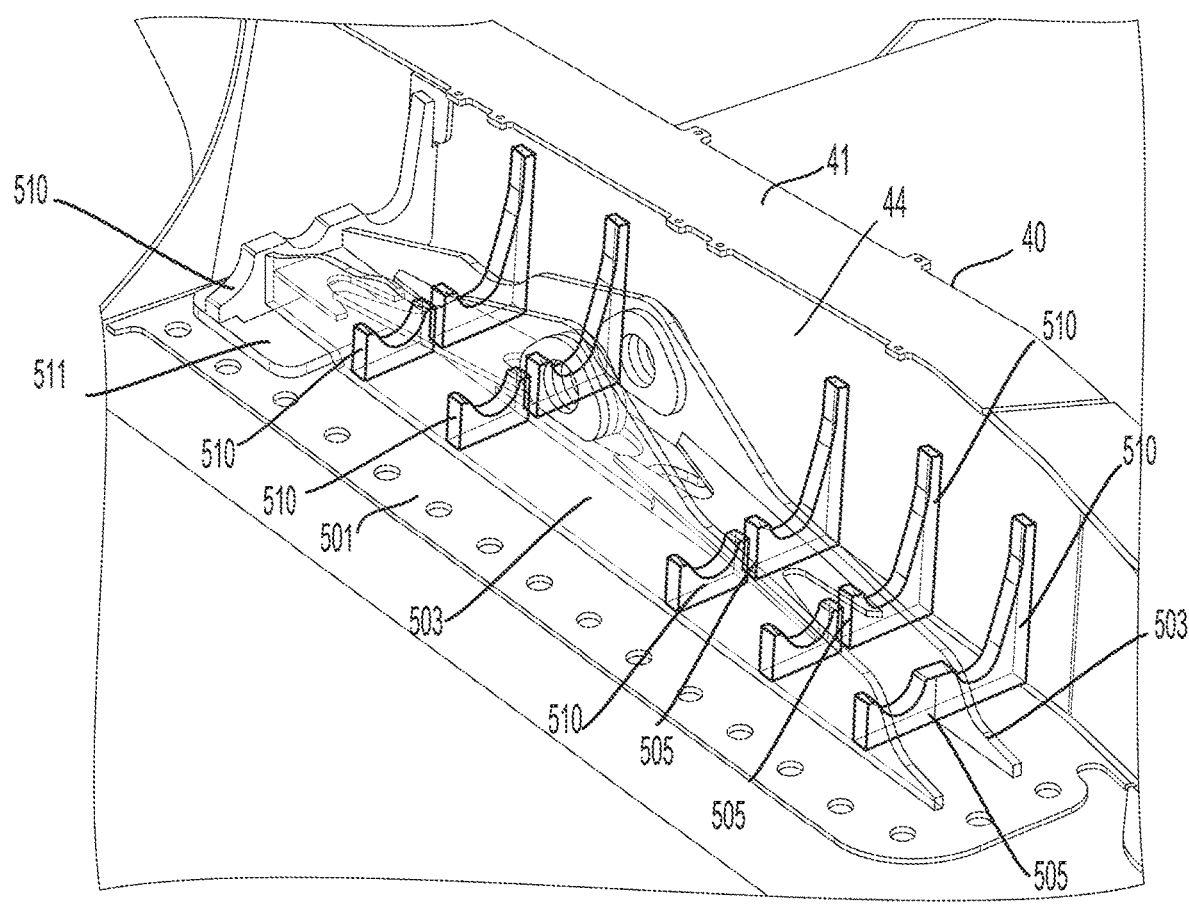

Some or all of the external gussets 510 can be the same confirmation. For instance, FIG. 4 shows one of the external gussets 510 at an end of the hoist plate arrangement 502 having a configuration different from the other external gussets 510. Though FIG. 4 shows six external gussets 510, embodiments of the disclosed subject matter are not so limited, and may include more or less than six external gussets 510. According to one or more embodiments, a first set of one or more external gussets 510 can be provided on one side of the connection interface 504 (e.g., FIG. 4 shows three) and a second set of one or more external gussets 510 can be provided on the other side of the connection interface 504 (e.g., FIG. 4 shows three). Additionally, some of the external gussets 510 can be a single unit or one-piece, and some of the external gussets 510 can be formed of multiple pieces. For instance, as shown in FIG. 7, for instance, the end external gussets 510 can be formed as a single unit or one-piece, whereas the external gussets 510 between the ends can be formed of multiple pieces (e.g., two aligned pieces).

At least a portion of some or all of the external gussets 510 can be provided between the hoist plate arrangement 502 and the longitudinal support structure 40. For instance, such portion of the external gussets 510 can extend from the hoist plate arrangement 502, transversely, toward and to the longitudinal support structure 40. That is, the external gussets 510 can extend from one of the hoist plates 503 closest to the longitudinal support structure 40 to the longitudinal support structure 40. The side wall of the closest hoist plate 503 to the longitudinal support structure 40 may be referred to as a first side, a first side wall, or a transversely inner hoist plate 503 of the hoist plate arrangement 502.

Another portion of the external gussets 510 may be provided between the hoist plate 503. Optionally, no portion of some or all of the external gussets 510 may extend from the hoist plate 503 (of the pair of hoist plates 503) farthest from the longitudinal support structure 40. The side wall of the farthest hoist plate 503 from the longitudinal support structure 40 may be referred to as a second side, a second side wall, or a transversely outer hoist plate 503 of the hoist plate arrangement 502.

A base plate 501, which can be fixedly coupled (e.g., welded) to the lower surface 32 of the bottom wall 31, may be provided between each of the hoist plate arrangement 502 and the lower surface 32 and the external gussets 510 and the lower surface 32. Optionally, the base plate 501 may be considered part of the hoist structure 50. Alternatively, the base plate 501 may be considered separate from the hoist structure 50. According to one or more embodiments, the base plate 501 may be referred to as a "doubler."

According to one or more embodiments, the hoist plate arrangement 502 and optionally some or all of the external gussets 510 can be in direct contact with the base plate 501. In this regard, the hoist plate arrangement 502, particularly the hoist plates 503 thereof can be fixedly coupled (e.g., welded) to the base plate 501. Optionally, the some or all of the external gussets 510 can be fixedly coupled (e.g., welded) to the base plate 501.

Optionally, according to one or more embodiments, a support plate 511 can be provided between a portion of the hoist plate arrangement 502 and the base plate 501 and between one or more external gussets 510, such as the end gusset 510, and the base plate 501. The hoist plate arrangement 502 and the external gusset(s) 510 may be fixedly coupled (e.g., welded) to the support plate 511, which, in turn, can be fixedly coupled (e.g., welded) to the base plate 501. The support plate 511 may be considered part of the hoist structure 50. Alternatively, the support plate 511 may be considered separate from the hoist structure 50. According to one or more embodiments, the support plate 511 may be referred to as a "doubler." Generally, the support plate 511 may be provided to provide stiffness to reduce increased loads that may be experienced relatively closer to the front wall 33 of the body 30, since this end of the hoist structure 50 can be relatively close to the front wall 33 of the body 30.

Turning to FIG. 5, FIG. 6, FIG. 10, and FIG. 11, the longitudinal support structures 40 can include a plurality of internal gussets 410. Though the figures show the internal gussets 410, the internal gussets 410 may be hidden (or substantially hidden in a case where the external gussets 510 directly contact the internal gussets 410) by a bottom wall 41 and sidewalls 44 of the longitudinal support structure 40.

Figure 6:
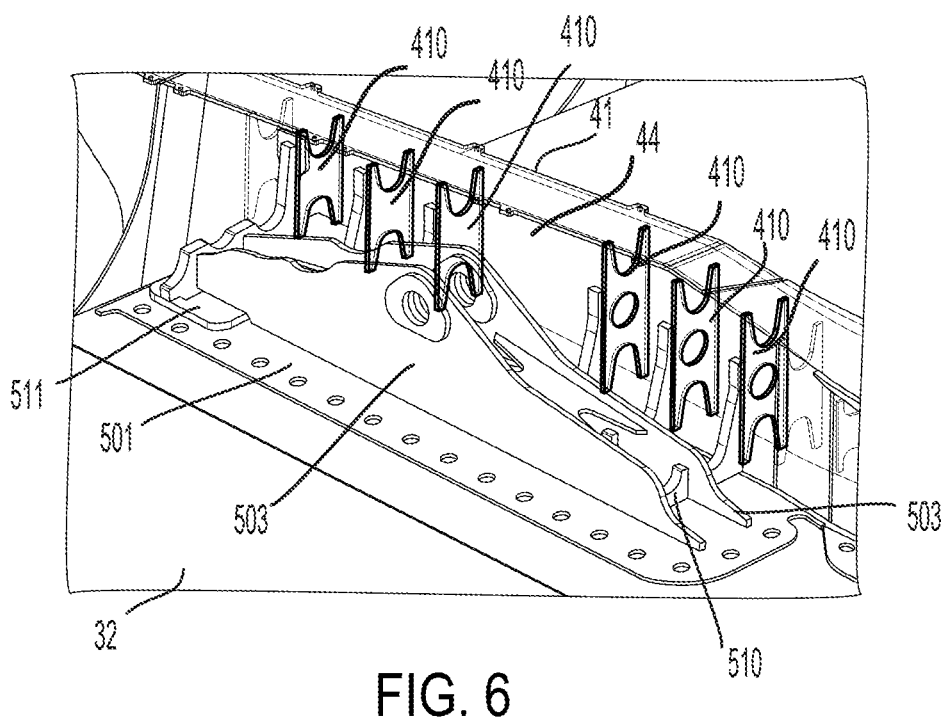

As shown, the internal gussets 410 can be spaced from each other in the longitudinal direction. The internal gussets 410 can be in the form of a plate, with one or more cutouts, to provide load support, specifically, to transfer loads from the hoist structure 50 to the longitudinal support structure 40 through the external gussets 510. The internal gussets 410 can be configured to provide a desired stiffness-flexibility effect to minimize stress concentration. Moreover, the configuration of the internal gussets 410 can be different for some or all of the internal gussets 410. For instance, central openings may be provided for internal gussets 410 that have a height sufficient to accommodate the central openings and still provide the necessary support, such as the three shown in FIG. 5, FIG. 6, and FIG. 10. The central openings may be implemented to reduce weight and to provide a suitable rigid/flexibility balance for the particular internal gusset 410, in light of the height of the particular internal gusset 410. According to one or more embodiments, some or all of the internal gussets 410 can be in the form or shape of an 'H,' such as shown in FIG. 6. The 'H' shape can reduce stress concentration at weld terminations at the four corners of the internal gusset 410.

According to one or more embodiments, the internal gussets 410 can be aligned in the transverse direction with respective ones of the external gussets 510. However, the internal gussets 410 can be physically separated from the external gussets 510. For instance, the sidewall 44 of the longitudinal support structure 40 can be between the internal gussets 410 and the external gussets 510. Hence, the internal gussets 410 may be effectively connected or coupled to the respective external gussets 510 via the sidewall 44. In this regard, the internal gussets 410 can be fixedly coupled (e.g., welded) to the sidewall 44. Likewise, the external gussets 510 can be fixedly coupled (e.g., welded) to the sidewall 44. The internal gussets 410 may also be fixedly coupled (e.g., welded) to the bottom wall 41 of the longitudinal support structure 40.

As shown in the figures, a height of the external gusset 510 at the interface with the sidewall 44 can be less than a height of the internal gusset 410 at the interface with the sidewall 44, though the height of the external gusset 510 at the interface may be the portion of the external gusset 510 with the greatest height. Though internal gussets 410 can be physically separated from the internal gussets 410, according to one or more embodiments of the disclosed subject matter the internal gussets 410 may be considered part of the hoist structure 50.

Alternatively, an opening or cutout (e.g., slot) may be provided in the sidewall 44 such that the external gussets 510 are in direct contact with respective ones of the internal gussets 410. Optionally, according to the alternative, embodiments of the disclosed subject matter can form pairs of the external gusset 510 and the internal gusset 410 as one-piece or integral, meaning that the combined external gusset 510/internal gusset 410 can extend, as one-piece, from the farthest hoist plate 503 though and to a far sidewall 44 of the longitudinal support structure 40. The cutout may be such that the sidewall 44 does not contact the external gusset 510. As a further option, the internal gusset 410, or the combined external gusset 510/internal gusset 410, can extend though an opening or cutout in the far sidewall 44 to extend from the far sidewall 44. Hence, the cutout/slots on the sidewall 44 of the longitudinal support structure 40 and the combined external gusset 510/internal gusset 410 can interlock. In this regard, alternatively, another set of external gussets may be provided in alignment with the internal gussets 410 (and the external gussets 510), but on an inboard side of the longitudinal support structure 40. That is, in one case the combined external gusset 510/internal gusset 410 can extend from the far sidewall 44 of the longitudinal support structure 40, and in another case separate external gussets may extend from the far sidewall 44 of the longitudinal support structure 40 and be separated from the internal gusset 410 (or the combined external gusset 510/internal gusset 410) by the far sidewall 44 of the longitudinal support structure 40.

Figure 10:
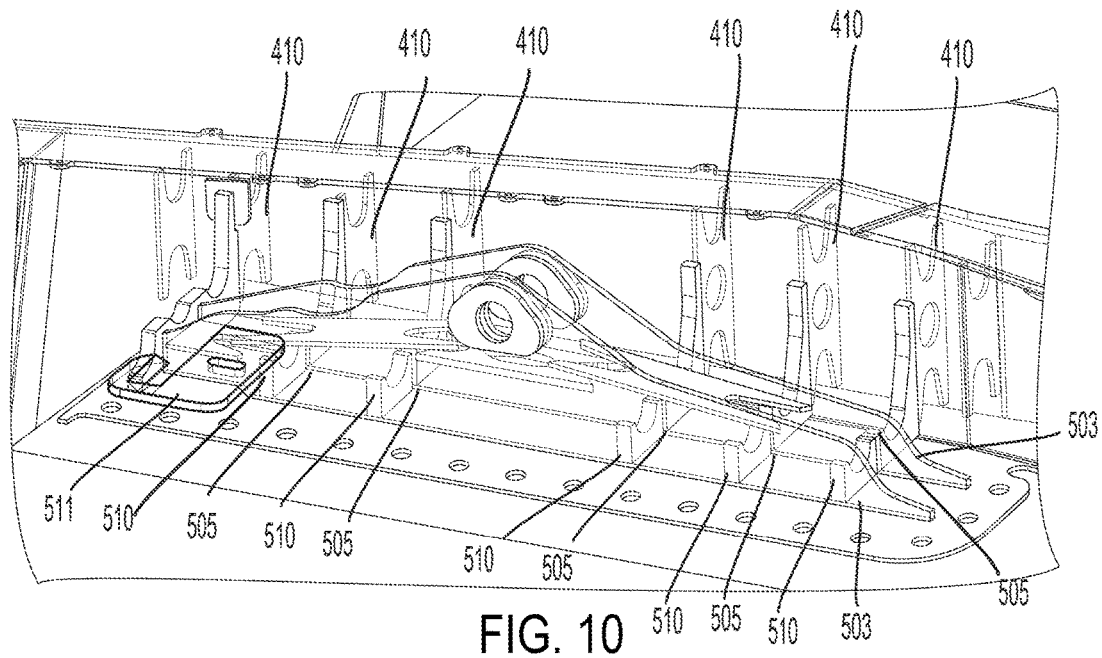
FIG. 10 and FIG. 11 are transparent perspective views of the hoist structure of FIG. 4.
Figure 11:
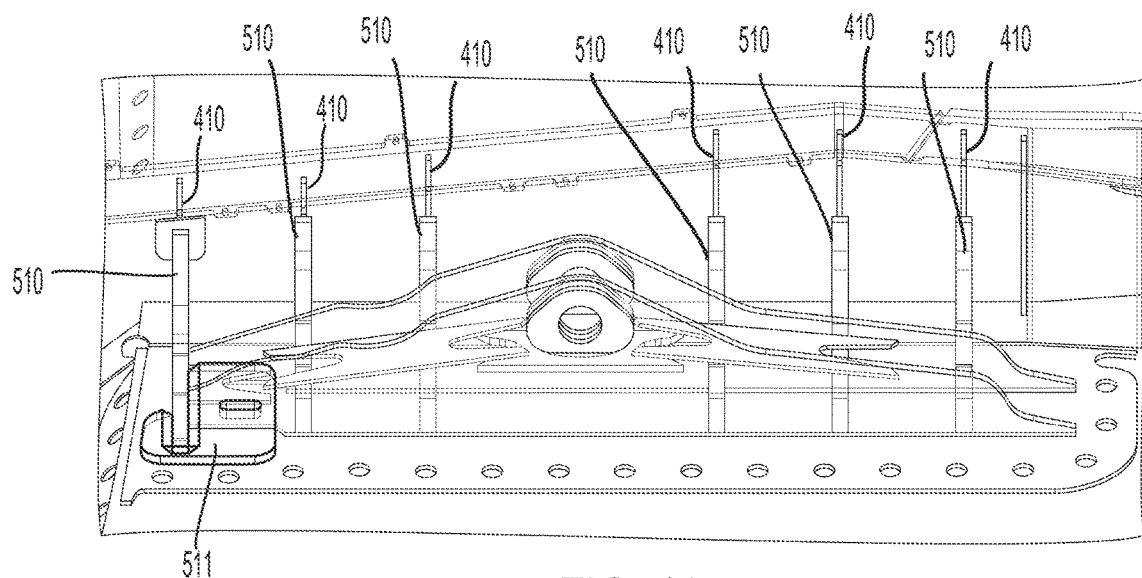

As noted above, the external gussets 510 can interface with the hoist plate arrangement 502. More specifically, as shown FIG. 7 and FIG. 10, a first end of the external gusset 510 (except for the end gusset) can abut the hoist plate 503 farthest from the longitudinal support structure 40. Optionally, the first end of the external gusset 510 can be fixedly coupled (e.g., welded) to the farthest hoist plate 503. The second end of the external gusset 510, as noted above, can abut and be fixedly coupled (e.g., welded) to the sidewall 44 of the longitudinal support structure 40 (or directly to one of the internal gussets 410 in an alternative embodiment). Between the first and second ends, a raised portion of the external gusset 510 can be received in a cutout or slot 505 (e.g., square shaped) of the hoist plate 503 closest to the longitudinal support structure 40. Thus, the raised portion of the external gusset 510 and the slot 505 of the hoist plate 503 can interlock. Optionally, the interface between the raised portion of the external gusset 510 and the slot 505 of the hoist plate 503 may be fixedly coupled (e.g., welded). According to one or more embodiments, the end external gusset 510, which can be provided on support plate 511, such as shown in FIG. 7 and FIG. 10, can abut ends of the hoist plates 503. Optionally, the end external gusset 510 can be fixedly coupled (e.g., welded) to the ends of the hoist plates 503.

INDUSTRIAL APPLICABILITY

As noted above, embodiments of the present disclosure relate to hoist support structures for bodies of haul trucks, and systems, arrangements, assemblies, and methods thereof.

Embodiments of the disclosed subject matter can eliminate entirely or at least relative to hoist structures transverse ribs or rails that extend transversely across the bottom of the body of a truck. Such elimination, along with a specific hoist structure configuration relative to longitudinal support structures on the bottom of the body can more evenly distribute loads and stresses by shifting the loads onto the longitudinal support structures.

Embodiments of the disclosed subject matter can implement the load shifting by, generally speaking, connecting the hoist brackets to longitudinal support structures via a plurality of gussets. The longitudinal support structures, such as longitudinal support structures 40, can be rectangular or generally rectangular, such as shown in the figures, or alternatively can be some other geometrical shape, such as trapezoidal, I-beam, or T-beam. As discussed above, the gussets can include at least external gussets 510, which can extend from the longitudinal support structure 40, to the hoist plate arrangement 502.

Internal gussets 410 may be provided inside the longitudinal support structure 40, and can be transversely aligned with respective ones of the external gussets 510. The internal gussets 410, however, can be physically separated from the external gussets 510. For instance, the sidewall 44 of the longitudinal support structure 40 can be between the internal gussets 410 and the external gussets 510. Hence, the internal gussets 410 may be effectively connected or coupled to the respective external gussets 510 via the sidewall 44 to distribute loads or stresses from the hoist plate arrangement 502 to the longitudinal support structure 40. In this regard, optionally, another set of external gussets may be provided in alignment with the internal gussets 410 (and the external gussets 510), but on an inboard side of the longitudinal support structure 40. That is, in one case the combined external gusset 510/internal gusset 410 can extend from the far sidewall 44 of the longitudinal support structure 40, and in another case separate external gussets may extend from the far sidewall 44 of the longitudinal support structure 40 and be separated from the internal gusset 410 (or the combined external gusset 510/internal gusset 410) by the far sidewall 44 of the longitudinal support structure 40.

The internal gussets 410 can be fixedly coupled (e.g., welded) to the sidewall 44. Likewise, the external gussets 510 can be fixedly coupled (e.g., welded) to the sidewall 44, or directly to the internal gussets 410 in an alternative embodiment. Though internal gussets 410 can be physically separated from the internal gussets 410 in some embodiments, according to one or more embodiments of the disclosed subject matter the internal gussets 410 may be considered part of the hoist structure 50.

As noted above, the external gussets 510 can interface with the hoist plate arrangement 502. For instance, as shown FIG. 7 and FIG. 10, a first end of the external gusset 510 (except for the end gusset) can abut the hoist plate 503 farthest from the longitudinal support structure 40. Optionally, the first end of the external gusset 510 can be fixedly coupled (e.g., welded) to the farthest hoist plate 503. The second end of the external gusset 510, as noted above, can abut and be fixedly coupled (e.g., welded) to the sidewall 44 of the longitudinal support structure 40, or directly to the internal gusset 410, in an alternative embodiment.

Between the first and second ends, a raised portion of the external gusset 510 can be received in a cutout or slot 505 (e.g., square shaped) of the hoist plate 503 closest to the longitudinal support structure 40. Thus, the raised portion of the external gusset 510 and the slot 505 of the hoist plate 503 can interlock. Optionally, the interface between the raised portion of the external gusset 510 and the slot 505 of the hoist plate 503 may be fixedly coupled (e.g., welded).

According to one or more embodiments, the end external gusset 510, which can be provided on support plate 511, such as shown in FIG. 7 and FIG. 10, can abut ends of the hoist plates 503. Optionally, the end external gusset 510 can be fixedly coupled (e.g., welded) to the ends of the hoist plates 503.

A height of the external gusset 510 at the interface with the sidewall 44 can be less than a height of the internal gusset 410 at the interface with the sidewall 44, though the height of the external gusset 510 at the interface may be the portion of the external gusset 510 with the greatest height. Though internal gussets 410 can be physically separated from the internal gussets 410, according to one or more embodiments of the disclosed subject matter the internal gussets 410 may be considered part of the hoist structure 50.

Alternatively, an opening or cutout (e.g., slot) may be provided in the sidewall 44 such that the external gussets 510 are in direct contact with respective ones of the internal gussets 410. Optionally, according to the alternative, embodiments of the disclosed subject matter can form pairs of the external gusset 510 and the internal gusset 410 as one-piece or integral, meaning that the combined external gusset 510/internal gusset 410 can extend, as one-piece, from the farthest hoist plate 503 though and to a far sidewall 44 of the longitudinal support structure 40. The cutout may be such that the sidewall 44 does not contact the external gusset 510. As a further option, the internal gusset 410, or the combined external gusset 510/internal gusset 410, can extend though an opening or cutout in the far sidewall 44 to extend from the far sidewall 44. Hence, the cutout/slots on the sidewall 44 of the longitudinal support structure 40 and the combined external gusset 510/internal gusset 410 can interlock.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An off-highway rear haul truck comprising:
    a dump body configured to be operatively coupled to a frame of the haul truck, the dump body including a bottom wall with an upper surface and a lower surface opposite the upper surface;
    a first longitudinal rail and a second longitudinal rail provided on the lower surface of the bottom wall, the first and second longitudinal rails being spaced from each other in a transverse direction of the dump body, and each of the first and second longitudinal rails extending in a longitudinal direction along the lower surface of the dump body; and
    a first rib-less hoist structure and a second rib-less hoist structure provided laterally outside of the first longitudinal rail and the second longitudinal rail, respectively, each of the first and second rib-less hoist structures being free of any transverse support structures that extend at least from the first longitudinal rail to the second longitudinal rail,
    wherein each of the first rib-less hoist structure and the second rib-less hoist structure includes:
        a pair of hoist plates spaced from each other in the transverse direction and extending in the longitudinal direction, the pair of hoist plates being configured to be rotatably coupled to a hoist member, and
        a plurality of external gussets spaced from each other in the longitudinal direction and extending in the transverse direction, the external gussets interfacing with the pair of hoist plates, and a portion of each of the external gussets being provided between the hoist plates and a closest one of the first longitudinal rail and the second longitudinal rail.

2. The off-highway rear haul truck according to claim 1, further comprising a first plurality of internal gussets provided inside the first longitudinal rail and a second plurality of internal gussets provided inside the second longitudinal rail,
    wherein the internal gussets of the first plurality are spaced from each other in the longitudinal direction and transversely aligned with respective ones of the external gussets of the first rib-less hoist structure, and
    wherein the internal gussets of the second plurality are spaced from each other in the longitudinal direction and transversely aligned with respective ones of the external gussets of the second rib-less hoist structure.

3. The off-highway rear haul truck according to claim 2,
    wherein three separate H-shaped gussets extend between each of the pairs of hoist plates, and
    wherein, for each of the pairs of hoist plates, the three separate H-shaped gussets do not contact doublers provide at pin bores of the pair of hoist plates.

4. The off-highway rear haul truck according to claim 1, wherein the first rib-less hoist structure and the second rib-less hoist structure are positioned closer to a front wall of the dump body than to a rear of the dump body and/or are positioned forward of a transverse midline of the bottom wall of the dump body.

5. The off-highway rear haul truck according to claim 1, wherein each of the first rib-less hoist structure and the second rib-less hoist structure is welded to an underlying base plate, which is welded to the lower surface of the bottom wall of the dump body.

6. The off-highway rear haul truck according to claim 1, wherein each of the internal gussets is in the form of an 'H.'

7. The off-highway rear haul truck according to claim 1, wherein, for each of the first rib-less hoist structure and the second rib-less hoist structure, all of each of the external gussets is between a transversely outer one of the pair of hoist plates and the closest one of the first longitudinal rail and the second longitudinal rail.

8. A support system for a body of a haul truck comprising:
    a first hoist structure; and
    a second hoist structure spaced from the first hoist structure in a transverse direction of the body of the haul truck such that a first longitudinal support structure of the body and a second longitudinal support structure of the body are between the first hoist structure and the second hoist structure;
    wherein each of the first hoist structure and the second hoist structure includes:
        a hoist plate arrangement extending in a longitudinal direction of the body and configured to be rotatably coupled to a hoist member of the haul truck, and
        a plurality of external gussets spaced from each other in the longitudinal direction and extending in the transverse direction, the external gussets interfacing with the hoist plate arrangement, and a portion of each of the external gussets extending from the hoist plate to a closest one of the first longitudinal support structure and the second longitudinal support structure.

9. The support system according to claim 8, wherein each of the first hoist structure and the second hoist structure is free of any transverse support structures that extend at least from the first longitudinal support structure to the second longitudinal support structure.

10. The support system according to claim 8, further comprising:
a first plurality of internal gussets provided inside the first longitudinal support structure; and
a second plurality of internal gussets provided inside the second longitudinal support structure,
wherein the internal gussets of the first plurality are transversely aligned with respective ones of the external gussets of the first hoist structure, and
wherein the internal gussets of the second plurality are transversely aligned with respective ones of the external gussets of the second hoist structure.

11. The support system according to claim 10,
wherein the first plurality of internal gussets are physically separated from the external gussets of the first hoist structure, and
wherein the second plurality of internal gussets are physically separated from the external gussets of the second hoist structure.

12. The support system according to claim 8, further comprising:
a first base plate; and
a second base plate,
wherein the hoist plate arrangement and the external gussets of the first hoist structure are in direct contact with the first base plate, and
wherein the hoist plate arrangement and the external gussets of the second hoist structure are in direct contact with the second base plate.

13. The support system according to claim 8,
wherein each said hoist plate arrangement includes a first hoist plate and a second hoist plate separated from the first hoist plate,
wherein at least gussets extend from the first hoist plate to the second hoist plate, including a first gusset, a second gusset, and a third gusset,
wherein no portions of the first, second, and third gussets contact any other of the first, second, or third gussets,
wherein no portion of the first, second, and third gussets contacts a doubler arrangement for a pin bore connection interface of the hoist plate arrangement,
wherein the first gusset is a middle gusset in the longitudinal direction relative to the second and third gussets, and
wherein the second and third gussets are angled relative to the first gusset and overlap the first gusset.

14. A hoist structure comprising:
an elongate hoist plate arrangement extending in a first direction and configured to be rotatably coupled to a hoist member of a haul truck;
a plurality of external gussets spaced from each other in the first direction and extending in a second direction perpendicular to the first direction,
wherein each of the external gussets interfaces with the elongate hoist plate arrangement, and
wherein a portion of each of the external gussets extends in the second direction from a first side of the elongate hoist plate arrangement.

15. The hoist structure according to claim 14, wherein the elongate hoist plate arrangement is free of any transverse support structures that extend entirely through the elongate hoist plate arrangement.

16. The hoist structure according to claim 14,
wherein the elongate hoist plate arrangement includes a connection interface, and
wherein a first set of multiple external gussets is provided on a first side of the connection interface and a second set of multiple external gussets is provided on a second side of the connection interface.

17. The hoist structure according to claim 14, further comprising a plurality of internal gussets aligned in the second direction with respective ones of the external gussets.

18. The hoist structure according to claim 14, further comprising an elongate support structure that extends in the first direction,
wherein the elongate support structure has a length greater than a length of the elongate hoist plate arrangement and is spaced from the elongate hoist plate arrangement in the second direction, and
wherein a portion of each of the external gussets is between the elongate hoist plate arrangement and the elongate support structure.

19. The hoist structure according to claim 14,
wherein the elongate hoist plate arrangement includes a first elongate hoist plate and a second elongate hoist plate separated from the first elongate hoist plate in the second direction,
wherein three separate H-shaped gussets extend from the first elongate hoist plate to the second elongate hoist plate, and
wherein the H-shaped gussets contact only the first elongate hoist plate and the second elongate hoist plate and do not contact doublers provided around pin bores of a connection interface of the elongate hoist plate arrangement.

20. The hoist structure according to claim 14, wherein no portion of at least some of the external gussets extends from a second side of the elongate hoist plate arrangement opposite the first side.

* * * * *